United States Patent [19]  
Alberts et al.

[11] Patent Number: 4,469,840  
[45] Date of Patent: Sep. 4, 1984

[54] AQUEOUS POLYSILOXANE FORMULATIONS

[75] Inventors: Heinrich Alberts, Cologne; Helmut Steinberger, Leverkusen, both of Fed. Rep. of Germany

[73] Assignee: Bayer Aktiengesellschaft, Leverkusen, Fed. Rep. of Germany

[21] Appl. No.: 448,590

[22] Filed: Dec. 10, 1982

[30] Foreign Application Priority Data

Dec. 30, 1981 [DE] Fed. Rep. of Germany ....... 3151924

[51] Int. Cl.$^3$ .................... C08F 283/06; C08F 283/12
[52] U.S. Cl. ..................... 524/500; 428/290; 524/504; 524/505; 525/404; 525/479
[58] Field of Search ............... 524/500, 504, 505; 525/404; 428/290

[56] References Cited

U.S. PATENT DOCUMENTS 3,342,766  9/1967  Huntington ................... 260/29.6
3,478,075  11/1969  Jack et al. .................... 525/403
4,368,290  1/1983  Alberts et al. ................ 525/404

FOREIGN PATENT DOCUMENTS 29947  6/1981  European Pat. Off. .
58340  8/1982  European Pat. Off. .
1570831  1/1970  Fed. Rep. of Germany .
2808504  9/1978  Fed. Rep. of Germany .
34854  3/1978  Japan ............................ 525/505

Primary Examiner—Wilbert J. Briggs, Sr.
Attorney, Agent, or Firm—Sprung Horn Kramer & Woods

[57] ABSTRACT

A process for the preparation of an organopolysiloxane composition, comprising polymerizing at a temperature from about room temperature to 250° C. a composition by weight comprising approximately (a) 10 to 90% organopolysiloxane,
(b) 4.999 to 85% of at least one of a surfactant and a water-soluble polyether,
(c) 85–5% of at least one polymerizable vinyl monomer, and
(d) 0.001 to 2% of a radical forming polymerization catalyst, whereby the vinyl monomer is polymerized and forms polymer bridges between (a) and (b). The resulting composition is miscible with and/or readily dispersible in water, is storage-stable and is especially useful as a textile auxiliary.

5 Claims, No Drawings

AQUEOUS POLYSILOXANE FORMULATIONS

The present invention relates to modified organopolysiloxane systems which are miscible with water or are easily dispersible in water.

Polysiloxanes, especially polysiloxane oils, are known to be more difficult to convert into the form of an emulsion than, for example, paraffin oils, as a result of the high interfacial tension at the phase interface between water and silicone oil.

Silicone oils, especially the industrial polydimethylsiloxane oils, are more difficult to emulsify the higher their viscosity. The production of a stable emulsion from a polydimethylsiloxane oil of viscosity of only about 1,000 mPa.s involves considerable difficulties ane these increase greatly with increasing viscosity (see, for example, W. Noll; Chemie and Technologie der Silicone [Chemistry and Technology of Silicones], Verlag Chemie, 2nd Edition, page 370). Thus there has been more than one attempt to find ways and means of improving the emulsifiability of silicone oils.

Examples of this are the incorporation of diphenylsiloxy units into the polydimethylsiloxane chain (loc. cit., page 370) and the synthesis of siloxane-cyano copolymers (compare, for example, DE-AS (German Published Specification) 1,595,730, DE-OS (German Published Specification) 1,745,423 and DE-OS (German Published Specification) 2,413,987).

Furthermore, for the emulsification of organosiloxanes, emulsifiers have been developed which have in the molecule a hydrophilic and a "siliconophilic" part, which latter contains organosilyl groups.

These can be either of the type of an organosilylcarboxylic acid or organosiloxanylcarboxylic acid or an alcohol (U.S. Patent No. 2,584,751). Both anionic and also cationic products have been prepared in accordance with this principle.

In addition, various techniques have been described in the literature, with the aid of which stable silicone oil emulsions can be obtained. Silicone oils of relatively high viscosity have been converted into stable emulsions by, for example, initially pre-emulsifying the oil in the presence of a non-ionic emulsifier in an alcohol, which is preferably monohydric, and then dispersing the pre-emulsion in water. Another method is indicated in that a low-molecular weight oil is converted to an aqueous dispersion and then is reacted as such with an acid or alkaline catalyst for a length of time sufficient for the oil to be polymerized to the desired molecular size.

The measures mentioned for obtaining stable silicone oil emulsions are relatively complicated and frequently require in practice a considerable amount of added auxiliaries.

In addition, the auxiliaries added can be found to interfere in respect of desired use effects, such as, for example, defoaming or hydrophobicity. Frequently, the properties of the emulsions prepared by the processes described above also do not satisfy all the requirements in respect of their ability to be diluted or their storage stability.

The synthesis of copolymers of the silicones with other organic polymers, which provide water-solubility, also involves several synthetic steps as a rule, usually using solvents and auxiliary bases which must be removed from the reaction material after completion of reaction.

The formation of water-soluble or water-dispersible polymers is thus only possible using syntheses which involve expenditure and, frequently, losses in yield.

Thus it was the object of the present invention to devise a simple process for the preparation of polysiloxane systems which are soluble in water or which are easily dispersible in water.

The object according to the invention is achieved by forming new types of copolymers by radical polymerization of mixtures of organopolysiloxanes, water-soluble polymers or surfactants such as, for example, polyalkylene oxides or derivatives of polyalkylene oxides and vinyl monomers, preferably vinyl acetate, which copolymers contain graft polymers of organopolysiloxane and the polyalkylene oxide or derivative of polyalkylene oxide employed and which are crosslinked by polymerized units of the vinyl monomers employed.

Graft polymers prepared in this manner are, depending on their composition, soluble in water or easily dispersible; when the silicone content is high, these polymers can easily be emulsified in water on addition of a relatively small amount of emulsifier.

Thus, the present invention relates to modified organopolysiloxane systems, which are miscible with water or which are easily dispersible in water, consisting of
(a) organopolysiloxanes,
(b) surfactants and/or water-soluble polyethers and
(c) graft copolymers which are formed by crosslinking via vinyl polymer bridges between the organopolysiloxanes and the surfactants and/or water-soluble polyethers.

The organopolysiloxane graft polymers which are soluble in water or dispersible in water according to the invention consist of
(1) 10–90% by weight of diorganopolysiloxane
(2) 5–85% by weight of surfactants and/or water-soluble polyethers and
(3) 85–5% by weight of polymerized units of vinyl compounds,
the total of the components 1 to 3 always being 100%.

The invention furthermore relates to aqueous polysiloxane formulations containing graft copolymer dispersions of
1. 10–90% by weight of diorganopolysiloxane
2. 5–85% by weight of polyoxyalkylene compound
3. 85–5% by weight of polymerized units of vinyl acetate and
4. 0–50% by weight of alpha, beta-unsaturated carboxylic acids or their derivatives.

The aqueous polysiloxane formulations according to the invention preferably contain graft copolymer dispersions of
1. 30–80% by weight of diorganopolysiloxane
2. 10–60% by weight of polyethylene oxide and
3. 60–10% by weight of polymerized units of vinyl acetate,
the total of the components always being 100% by weight.

The present invention furthermore relates to aqueous emulsions of graft polymers consisting of 60 to 0.1, preferably 45 to 1, % by weight of graft polymer dispersions, 0.01 to 18% by weight, preferably 0.05 to 10% by weight of emulsifiers and 99.899 to 22, preferably 98.95 to 45% by weight of water. The emulsifiers used advantageously consist of a mixture of a hydrophilic component and a hydrophobic component. Suitable compounds are, for example, fatty acid esters of glycols, glycerol or sorbitol, and also higher fatty alcohols or the addition products of ethylene oxide on these fatty alcohols, fatty acids or similar compounds having an active hydrogen atom. However, anion-active emulsifiers, such as sodium lauryl sulphate or sodium dodecylbenzenesulphonate or alkyl, aryl or alkylaryl carboxylates or also cation-active emulsifiers, such as quaternary ammonium compounds are also suitable.

The invention furthermore relates to a process for the preparation of aqueous polysiloxane formulations, which is characterized in that
I. 5-75% by weight of water
II. 0.5-15% by weight of emulsification and/or dispersion auxiliary and
III. 94.5-10% by weight of graft copolymer dispersion of the type described above,
the total of the components always being 100%, are converted into an aqueous solution or emulsion at temperatures between room temperature and 130° C. under the action of shear forces.

The preparation of the graft copolymer dispersions is carried out in such a manner that mixtures of one or more organopolysiloxanes, surfactants, polyalkylene oxide or derivatives of polyalkylene oxide and one or more vinyl monomers, preferably vinyl acetate, are brought to a reaction temperature which initiates polymerization in the presence of radical-formers.

The polymerization can be carried out by a continuous or a discontinuous process.

The organopolysiloxanes used are largely linear and can be represented by the following formulae:

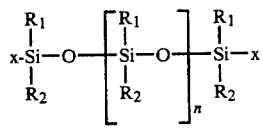

x=OH, CH=CH$_2$, CH$_3$, phenyl
R$^1$, R$^2$=CH$_3$, C$_2$H$_5$, CH=CH$_2$, phenyl
n=10 to 5,000.

In addition to methyl groups, up to 50 mol-% of ethyl, vinyl or phenyl groups can be present in the organopolysiloxane components, but methyl-substituted organopolysiloxanes are preferably employed. Organopolysiloxanes terminated with OH groups can also be used.

The emulsifiers used advantageously consist of a mixture of a hydrophilic component and a hydrophobic component. Suitable compounds are, for example, fatty acid esters of polyhydric alcohols, such as, for example, stearates of glycols, glycerol or sorbitol, and also higher fatty alcohols or the addition products of ethylene oxide on these fatty alcohols, fatty acids or similar compounds having an active hydrogen atom. However, anion-active emulsifiers, such as sodium lauryl sulphate or sodium dodecylbenzenesulphonate or alkyl, aryl or alkylaryl carboxylate, or also cation-active emulsifiers, such as quaternary ammonium compounds are also suitable.

The polyalkylene oxides or derivatives of polyalkylene oxide employed for the graft copolymerization have hydroxyl groups as a rule, preferably 1 to 8 hydroxy groups, and are prepared by, for example, polymerization of epoxides, such as ethylene oxide, propylene oxide, butylene oxide or tetrahydrofuran with themselves, for example, in the presence of polymerization catalysts or by addition of these epoxides, optionally in a mixture or consecutively, to starting components having reactive hydrogen atoms, such as water, alcohols or phenol or phenol derivatives, amines or amides. Ethylene oxide or propylene oxide (as a mixture or consecutively) are preferably employed.

Examples of derivatives of polyalkylene oxides are polyglycols which are prepared by polymerization of ethylene oxide with butanol or butylglycol as the starter molecule and which have the general formula

or branched polyglycols produced by polymerization of ethylene oxide and propylene oxide, in a mixture or consecutively, started on trimethylolpropane, having the formula:

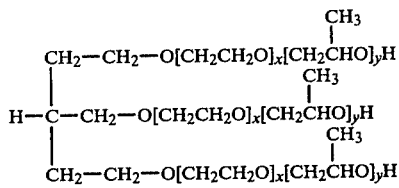

or linear, produced by polymerization of ethylene oxide started on alkylphenol, having the formula

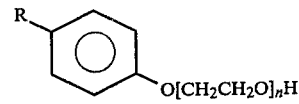

(R=n-alkyl, i-alkyl; n=1 to 100).

Examples of vinyl monomers which may be included are: olefins such as ethylene, propylene, isobutylene, vinyl esters of aliphatic or aromatic carboxylic acids, preferably vinyl acetate, vinyl propionate, α, β-unsaturated monocarboxylic or dicarboxylic acids and their derivatives, mention being made of (meth)acrylic acid, methyl (meth)acrylate, ethyl (meth)acrylate, propyl or isopropyl (meth)-acrylate, n-butyl, iso- or tert.-butyl (meth)acrylate, 2-ethylhexyl (meth)acrylate, (meth)acrylamide, N-alkyl-substituted (meth)acrylamide derivatives, (meth)acrylonitrile, maleic anhydride, maleic acid amide, N-alkylmaleinimide, maleic acid semi- or diesters, vinylaromatic compounds such as styrene, α-methylstyrene, 4-chlorostyrene, vinyl chloride, vinylidene chloride, vinylidene fluoride, tetrafluoroethylene, vinyl ethers, such as ethyl vinyl ether or n-butyl vinyl ether; the following allyl compounds may be quoted: allyl alcohol, allyl acetate, isobutene diacetate, 2-methylene-1,3-propanediol, allylethyl carbonate and allylphenyl carbonate. If it is desired to crosslink or increase the molecular weights of the vinyl resin phase, divinyl compounds or diallyl compounds can be employed. The following may be mentioned: divinylbenzene, (meth)acrylates of polyhydric alcohols such as, for example, ethelene glycol dimethacrylate, diethylene glycol diacrylate and divinyl ether. Vinyl acetate is preferably used.

The radical polymerization of the vinyl monomers can be started in a manner which is known in itself, with the aid of radical-formers, UV rays, alpha, beta or gamma rays or thermally without further additives. The polymerization initiated by radiation is preferably carried out in the presence of sensitizers compare, for example, A. D. Jenkins, A. Ledwith, Reactivity, Mechanism and Structure in Polymer Chemistry, John Wiley & Son, London, New York, 1974, page 465.

In order to start the radical polymerization of the vinyl monomers, radical fomers are employed in amounts between 0.001 to 2, preferably 0.02 to 0.8% by weight, relative to the total mixture of organopolysiloxane, polyester and vinyl monomers. Examples of radical formers which may be quoted are azo initiators, such as azobisisobutyronitrile (AIBN), azo esters, azoimino esters or azo-N-alkylamides, peroxides, such as di-tert.-butyl peroxide, dicumyl peroxide, dibenzoyl peroxide, peresters, such as amyl perpivalate tert.-butyl perpivalate, tert.-butyl peroctoate, t-butyl perbenzoate, tert.-butyl perneodecanoate, percabonates, such as cyclohexyl percarbonate or hydroperoxides, such as, for example, cumyl hydroperoxide and tert.-butyl hydroperoxide.

Other suitable initiators are benzpinacol, benzpinacol derivatives or other thermally labile highly substituted ethane derivatives.

Furthermore, the polymerization can be started with the aid of redox systems at temperatures which are lower than the temperatures of pure thermal decomposition of the radical formers.

Examples of redox initiators which may be mentioned are combinations of peroxides and amines, such as, for example, benzoyl peroxide and triethylamine, trialkylboron compounds and oxygen, hydroperoxides and sulphinic acids, formaldehyde or aldoses or combinations with low-valent transition materials and sulphur dioxide/peroxide redox systems.

The polymerization reaction can be carried out continuously or discontinuously, under normal pressure or under reaction pressures up to, for example, 300 bar, preferably up to 15 bar, at reaction temperatures between —° C. and +250° C., preferably 70° to 190° C.; the reaction may be carried out in the presence of solvents, mention being made of water, alcohols such as methanol, ethanol, tert.-butanol, aliphatic or aromatic hydrocarbons, halogenated hydrocarbons such as chlorobenzene or fluorinated compounds, ethers such as dioxane or tetrahydrofuran or esters such as, for example, ethyl acetate.

However, the polymerization is preferably carried out without a solvent.

When desired, the polymerisation reaction can be carried out in the presence of molecular-weight regulators. Regulators which may be quoted are mercaptans such as n- or tert.-dodecyl mercaptan, thioglycol, thioglycerol or thioacetic esters. Also sulphur-free molecular-weight regulators such as hydrocarbons, examples which may be mentioned being paraffin fractions such as, for example, petroleum ether, light naphtha or cleaning naphtha, α-olefins such as, for example, propylene, isobutylene and 1-butene, also ketones such as, for example, acetone, methyl ethyl ketone or cyclohexanone, also aldehydes such as, for example, formaldehyde, acetaldehyde, propionaldehyde, isobutyraldehyde or allyl compounds such as, for example, allyl alcohol, allyl acetate, isobutene diacetate or allyl carbonate. In addition, suitable telogens are halogenated hydrocarbons such as methylene chloride, tetrachloroethane, dibromethane and the like. As was to be expected, the viscosities of the copolymers can be controlled with the aid of these types of regulators.

The degree of conversion of the monomers employed is determined by the polymerization process chosen and the reaction conditions. In the discontinuous method of polymerization, conversions which are as high as possible are desirable so that at least 80% of the monomers employed, but preferably more than 90%, are converted. Removal of remaining monomers is carried out in accordance with known processes by distillation under normal pressure or under reduced pressure. The effective contents of remaining monomer still found in the dispersions after working-up are negligibly small, generally being below 1,000 ppm, preferably below 100 ppm.

The graft copolymers according to the invention are used as textile auxiliaries such as, for example, for the variation of handle in synthetic and natural fiber materials and sheet structures, and additionally as finishing agents for thread materials for improving the sliding properties of the thread in stitching processes.

The following examples illustrate the preparation of the silicone-polyether-vinyl polymer dispersions according to the invention.

Unless otherwise noted, amounts given are to be understood as parts by weight or percentages by weight.

PREPARATION OF THE STARTING SUBSTANCES

The preparation of the polydiorgnosiloxanes is carried out in a manner known in itself (compare W. Noll, Chemie und Technologie der Silikone [Chemistry and Technology of Silicones], Verlag Chemie GmbH, Weinheim/Bergstr., 2nd Edition, 1968, Chapter 5, 162 et seq.).

The polysiloxanes dealt with in the examples are characterized as follows:

| Polysiloxane No. | Description | Viscosity mPa.s at 25° C. |
|---|---|---|
| 1 | Polydimethylsiloxane | 1,000 |
| 2 | OH end-stopped polydimethylsiloxane | 5,000 |
| 3 | Trimethylsilyl end-stopped, containing Si-H groups | 20 |

The polyalkylene oxides or derivatives of polyalkylene oxides dealt with in the examples have the following characteristics:

| Polyalkylene oxide | Composition | Physical characteristics |
|---|---|---|
| A | Polyethylene glycol | m.p.: 58–60° C. mol weight about 1,500 |
| B | Sorbitan trioleate | |
| C | Oleyl alcohol ethoxylate | |
| D | Oleyl alcohol ethoxylate | |

EXAMPLE 1 and 2

1,000 g of polyalkylene oxide A and 1,600 g of polysiloxane No. 2 are initially introduced into a 6 l stirred vessel under nitrogen. The mixture is heated to 110° C., with stirring, and then the solution is added within 2 hours at an internal temperature of 110° C.:

| Example No. | Solution of vinyl acetate | Polysiloxane No. 2 | tert.-Butyl perpivalate | Azodiisobutyric acid diethylates |
|---|---|---|---|---|
| 1 | 1,000 | 400 | 4.5 | — |
| 2 | 1,000 | — | — | 6.0 |

Then stirring is continued for 1 hour at 110° C. and the volatile fractions are then distilled off in vacuo. The conversion of vinyl acetate in Example 1 is 94.5% and in Example 2 is 92.8%. After cooling down to room temperature, the products are solid.

EXAMPLE 3

1,000 g of polyalkylene oxide A and 1,600 g of polysiloxane No. 1 in a 6 l stirred vessel under nitrogen are heated to 110° C. with stirring. Then a solution of 1,000 g of vinyl acetate, 400 g of polysiloxane No. 1 and 4.5 of tert.-butyl perpivalate is added within 2 hours, and the internal temperature is kept constant at 110° C. Then stirring is continued for 1 hour at 110° C. and the volatile fractions are then removed in vacuo. The conversion of vinyl acetate is 92.1%. After cooling down to room temperature, the dispersion has a viscosity of 8,000 mPa.s.

EXAMPLE 4

450 g of polysiloxane No. 1 and 225 g each of polyalkylene oxide B and C in a 2 l stirred vessel under nitrogen are heated to 110° C. Then, at an internal temperature of 110° C., a solution of 300 g of vinyl acetate, 150 g of polysiloxane No. 1 and 1.7 g of tert.-butyl perpivalate is subsequently stirred within 2 hours and the volatile fractions are removed in vacuo. The conversion of vinyl acetate is 91% and the viscosity of the dispersion cooled down to room temperature is measured to be 46,500 mPa.s.

EXAMPLE 5

300 g of polysiloxane No. 2 and 300 g of polyalkylene oxide D in a 2 l stirred vessel under nitrogen are heated to 110° C. Then a solution of 200 g of vinyl acetate, 100 g of polysiloxane 2 and 1.2 g of tert.-butyl perpivalate are added within 2 hours and stirring is continued for 2 hours at 110° C. The volatile fractions are distilled off in vacuo. The conversion of vinyl acetate is 93.6%. The reaction product is solid at room temperature.

EXAMPLE 6

450 g of polysiloxane No. 1 and 450 g of dimethylbenzyldodecylammonium chloride in a 2 l stirred vessel under nitrogen are heated in 110° C. Then, at an internal temperature of 110° C., a solution of 150 g of vinyl acetate, 150 g of polysiloxane No. 1 and 2.5 of tert.-butyl perpivalate is added within 2 hours. Then stirring is continued for 1 hour and the volatile fractions are removed in vacuo. The conversion of vinyl acetate is 94% and the viscosity of the dispersion cooled down to 25° C. is measured to be 14,000 mPa.s.

EXAMPLE 7

450 g of polysiloxane No. 1 and 225 g each of polyalkylene oxide B and C in a 2 l stirred vessel under nitrogen are heated to 100° C. and, at an internal temperature of 100° C., a solution of 300 g of vinyl acetate, 150 g of polysiloxane No. 1 and 2.25 g of tert.-butyl perpivalate is metered in in 2 hours. The mixture is then stirred a further 1 hour and the volatile fractions are removed in vacuo. The conversion of vinyl acetate is 91% and the viscosity of the dispersion cooled down to 25° C. is measured to be 46,000 mPa.s.

EXAMPLE 8

3 kg of polysiloxane No. 3 are initially introduced into a 6 l stirred vessel under nitrogen and heated to 110° C. Then a solution of 7.5 g of tert.-butyl perpivalate in 750 g of vinyl acetate is metered in at an internal temperature of 110° C. within 2 hours. The mixture is then stirred a further one hour and the volatile fractions are then removed in vacuo. The conversion of vinyl acetate is 93.5%. After cooling down to room temperature, the clear product has a viscosity of 170 mPa.s.

EXAMPLE 9

1,600 g of a glycol-siloxane copolymer having a mean molecular weight of 10,500 and a siloxane content of 48% and 1,000 g of polyalkylene oxide A are initially introduced into a 6 l stirred vessel under nitrogen and heated to 110° C. A mixture of 1,000 g of vinyl acetate and 6 g of diethyl azobisisobutyrate is metered in within 2 hours and then subsequently stirred for one hours. The volatile fractions are then removed in vacuo. The conversion of vinyl acetate is 94.8%. After cooling down to room temperature, a solid wax-like mass is obtained.

EXAMPLE 10

1.6 kg of an oleyl alcohol ethoxylated with 50 mols of ethylene oxide and 1.4 kg of a tridecyl alcohol reacted with 6 mols of ethylene oxide are added, with stirring, to 40.0 kg of a graft copolymer dispersion of Example 3. The mixture is heated to 60° C. and 57.0 kg of water are worked in with stirring. A homogeneous and stable emulsion of the graft copolymer is obtained.

EXAMPLE 11 to 17

By procedures analogous to Example 10, emulsions of the following compositions are obtained:

| Graft copolymer of Example | % by weight | Emulsifier | High-pressure homogenization |
|---|---|---|---|
| 4 | 35 | 1% of sorbitan trioleate | no |
| 5 | 40 | 1.5% of sorbitan trioleate and 1.5% of oleyl-50-ethoxylate | once under 200 bar |
| 6 | 30 | — | once under 200 bar |
| 7 | 35 | 1% of sorbitan trioleate | twice under 200 bar |
| 8 | 40 | — | no |
| 9 | 30 | — | once under 200 bar |

It will be appreciated that the instant specification and examples are set forth by way of illustration and not limitation, and that various modifications and changes may be made without departing from the spirit and scope of the present invention.

We claim:

1. An aqueous emulsion by weight comprising approximately
   (a) 22 to 99.899% of water,
   (b) 0.01 to 18% of an emulsifier, and (c) 0.1 to 60% of a composition produced by polymerizing at a temperature from about room temperature to 250° C. a composition by weight comprising approximately
  (i) 10 to 90% organopolysiloxane,
  (ii) 4.999 to 85% of at least one of a surfactant and a water-soluble polyether.
  (iii) 85–5% of at least one polymerizable vinyl monomer, and
  (iv) 0.001 to 2% of a radical forming polymerization catalyst.
whereby the vinyl monomer is polymerized and forms polymer bridges between (i) and (ii).

2. An emulsion according to claim 1, wherein the organopolysiloxane is a diorganopolysiloxane.

3. An emulsion according to claim 1, wherein the vinyl monomer comprises at least on member selected from the group consisting of vinyl esters $\beta$-unsaturated carboxylic acids, derivatives of $\alpha, \beta$-unsaturated monocarboxylic and dicarboxylic acids, vinylaromatic compounds, $\alpha$-olefins, vinyl ethers, halogenated vinyl monomers, allyl compounds, divinyl compounds and (meth)acrylates of polyhydric alcohols.

4. An aqueous emulsion by weight comprising approximately
  (a) 45 to 98.95% of water,
  (b) 0.05 to 10% of an emulsifier, and
  (c) 1 to 45% of a composition produced by polymerizing at a temperature from about room temperature to 250° C. a composition by weight comprising approximately
    (i) 10 90% organopolysiloxane,
    (ii) 4.999 to 85% of at least one of a surfactant and a water-soluble polyether,
    (iii) 85–5% of at least one polymerizable vinyl monomer, and
    (iv) 0.001 to 2% of a radical forming polymerization catalyst,
whereby the vinyl monomer is polymerized and forms polymer bridges between (i) and (ii).

5. In the finishing of textiles by treatment with an organopolysiloxane-containing composition, the improvement which comprises employing as said composition an emulsion according to claim 1.

* * * * *